(12) United States Patent
Schwartz et al.

(10) Patent No.: US 8,035,818 B2
(45) Date of Patent: Oct. 11, 2011

(54) SOLID-STATE LASER GYRO OPTICALLY ACTIVE THROUGH ALTERNATING BIAS

(75) Inventors: Sylvain Schwartz, Paris (FR); Gilles Feugnet, Palaiseau (FR); Jean-Paul Pocholle, La Norville (FR)

(73) Assignee: Thales (FR)

( * ) Notice: Subject to any disclaimer, the term of this patent is extended or adjusted under 35 U.S.C. 154(b) by 617 days.

(21) Appl. No.: 12/097,429

(22) PCT Filed: Dec. 7, 2006

(86) PCT No.: PCT/EP2006/069440
§ 371 (c)(1),
(2), (4) Date: Dec. 1, 2008

(87) PCT Pub. No.: WO2007/068652
PCT Pub. Date: Jun. 21, 2007

(65) Prior Publication Data
US 2011/0194119 A1    Aug. 11, 2011

(30) Foreign Application Priority Data
Dec. 13, 2005   (FR) .................................... 05 12608

(51) Int. Cl.
*G01C 19/64*  (2006.01)
(52) U.S. Cl. ....................................................... 356/459
(58) Field of Classification Search .................. 356/459, 356/460
See application file for complete search history.

(56) References Cited

U.S. PATENT DOCUMENTS

| 3,867,034 A | 2/1975 | Aronowitz |
| 4,222,668 A | 9/1980 | Henry |
| 5,408,492 A | 4/1995 | Vossler et al. |
| 6,658,039 B2 * | 12/2003 | Numai ............................ 372/94 |
| 7,230,686 B1 | 6/2007 | Schwartz et al. |
| 7,319,513 B2 | 1/2008 | Schwartz et al. |
| 7,446,879 B2 * | 11/2008 | Feugnet et al. ............... 356/459 |
| 7,548,572 B2 * | 6/2009 | Schwartz et al. .............. 372/94 |
| 7,589,841 B2 * | 9/2009 | Schwartz et al. ............. 356/459 |
| 7,710,575 B2 * | 5/2010 | Schwartz et al. ............. 356/459 |
| 2002/0021732 A1 * | 2/2002 | Numai ............................ 372/94 |
| 2002/0196445 A1 * | 12/2002 | McClary et al. .............. 356/475 |
| 2003/0020918 A1 | 1/2003 | Murakowski et al. |
| 2004/0202222 A1 | 10/2004 | Pocholle et al. |

(Continued)

FOREIGN PATENT DOCUMENTS
FR    2193193 A1    7/1973
(Continued)

*Primary Examiner* — Patrick J Connolly
(74) *Attorney, Agent, or Firm* — Lowe Hauptman Ham & Berner, LLP

(57) ABSTRACT

The field of the invention is that of solid-state laser gyros used for the measurements of rotation speed or relative angular positions. This type of equipment is notably used for aeronautical applications. The object of the invention is to complete the optical devices necessary to control the instability of lasers by specific optical devices enabling elimination of the dead zone and of population inversion gratings exiting in the amplifying medium. An "all optical" solid-state laser is hence obtained without moveable parts, stable and without a dead zone. To this end, the laser gyro according to the invention comprises notably and optical assembly enabling a nonreciprocal optical phase-shift to be introduced between the counterpropagating modes; and control means allowing the phase-shift amplitude to be varied periodically around a mean value that is very approximately zero.

14 Claims, 5 Drawing Sheets

U.S. PATENT DOCUMENTS

| | | |
|---|---|---|
| 2006/0256828 A1* | 11/2006 | Schwartz et al. ............... 372/94 |
| 2007/0109549 A1* | 5/2007 | Sanders et al. ................ 356/469 |
| 2007/0223001 A1 | 9/2007 | Feugnet et al. |
| 2008/0037026 A1 | 2/2008 | Feugnet et al. |
| 2008/0043225 A1 | 2/2008 | Schwartz et al. |
| 2009/0073452 A1 | 3/2009 | Feugnet et al. |
| 2009/0116031 A1* | 5/2009 | Schwartz et al. ............. 356/459 |

FOREIGN PATENT DOCUMENTS

| | | |
|---|---|---|
| FR | 2853061 A1 | 10/2004 |
| WO | 2004094952 A1 | 11/2004 |
| WO | 2005066586 A1 | 7/2005 |

* cited by examiner

SOLID-STATE LASER GYRO OPTICALLY ACTIVE THROUGH ALTERNATING BIAS

CROSS-REFERENCE TO RELATED APPLICATIONS

The present Application is based on International Application No. PCT/EP2006/069440, filed on Dec. 7, 2006, which in turn corresponds to French Application No. 0512608 filed on Dec. 13, 2005, and priority is hereby claimed under 35 USC §119 based on these applications. Each of these applications are hereby incorporated by reference in their entirety into the present application.

FIELD OF THE INVENTION

The field of the invention is that of solid-state laser gyros used for the measurement of rotation speed or relative angular positions. This type of equipment is notably used for aeronautical applications.

BACKGROUND OF THE INVENTION

The laser gyro, developed around thirty years ago, is widely commercialized and used these days. Its operational principle is based on the Sagnac effect, which leads to a frequency difference ΔF between the two optical transmission modes propagating in opposite directions, called counterpropagating, of a bidirectional ring laser cavity when it is stimulated by a rotational movement. Conventionally, the frequency difference ΔF is equal to:

$$\Delta F = 4 A \bar{\omega}/\lambda L$$

where L and A are the optical length and the area of the cavity respectively; λ is the wavelength of the laser transmission without the Sagnac effect; $\bar{\omega}$ is the speed of angular rotation of the laser gyro.

The measurement of ΔF obtained by spectral analysis of the beating of the two transmitted beams enables the value of $\bar{\omega}$ to be known with very great precision.

Electronically counting the interference beats that pass during a change in angular position also enables the relative value of the angular position to be known with very great precision.

The production of laser gyros presents certain technical difficulties. A first difficulty is linked with the quality of the beating between the two beams, which determines the proper operation of the laser gyro. This is because good stability and relative equality of the intensities transmitted in the two directions is necessary to obtain correct beating. For in the case of solid-state lasers this stability and this equality are not ensured due to the phenomenon of intermodal competition, which causes one of the two counterpropagating modes to tend to monopolize the available gain to the detriment of the other mode. The problem of instability of the bidirectional transmission for a solid-state ring laser may be solved, for example, by fitting a negative feedback loop intended to control the difference between the intensities of the two counterpropagating modes around a fixed value. This loop acts on the laser either by making its losses dependent on the direction of propagation, for example by means of an assembly comprising an element inducing a reciprocal rotation, an element inducing a nonreciprocal rotation and a polarizing element (patent application no. 03/03645), or by making its gain dependent on the direction of propagation, for example by means of an assembly comprising an element inducing a reciprocal rotation, an element inducing a nonreciprocal rotation and a polarized emission crystal (patent application no. 03/14598). Once controlled, the laser emits two counterpropagating beams, the intensities of which are stable and may be used as a laser gyro.

A second technical difficulty is linked with the domain of low rotation speeds, the laser gyro only operating correctly beyond a certain rotation speed. At low rotation speeds the Sagnac beat signal disappears because of a coupling between the two counterpropagating modes due to backscattering of the light caused by the reflectors and the various optical elements possibly present in the cavity. The domain of low rotation speeds for which this phenomenon is produced is commonly called the "dead zone". This problem is not intrinsic to the solid state. It is also encountered in the gas laser gyro field. The most commonly adopted solution for this latter type of laser gyro consists in mechanically activating the device by imposing on it a forced periodic movement that artificially puts it outside the dead zone as often as possible. Another solution consists in introducing a constant phase shift between the two optical paths, which results in a frequency bias between the two counterpropagating modes. Hence, the operational field of the laser gyro is artificially moved outside the dead zone. However, this latter solution has the significant drawback that the value of the bias introduced must be perfectly stable over time.

A third difficulty is linked, in the context of solid-state lasers, with the fact that the counterpropagating waves interfere in the amplifying medium, creating a population inversion grating. In fact, if the amplifying medium is a solid Nd:YAG crystal, it is possible to show that in such a medium the population inversion gratings caused by stimulated emission in the gain medium has the effect of destabilizing the bidirectional emission. In addition, when the laser gyro is rotating, these gratings become mobile and through the Doppler effect cause a frequency shift between the two counterpropagating waves circulating in the laser cavity, which increases the nonlinearity of the frequency response of the laser gyro.

SUMMARY OF THE INVENTION

The object of the invention is to propose specific optical devices enabling elimination or limitation of the effects of the dead zone and of population inversion gratings by means of a variable periodic bias which circumvents the preceding drawbacks. An "entirely optical" solid-state laser is hence obtained that has no moving parts, is stable and is without problematic effects due to the dead zone and the population inversion gratings.

More precisely, the subject of the invention is a laser gyro enabling measurement of the angular velocity or the relative angular position about a determined rotation axis, comprising at least:
- an optical ring cavity in which two counterpropagating optical modes circulate;
- a solid-state amplifying medium;
- a device for stabilizing the intensities of the counterpropagating modes;

characterized in that said cavity also comprises:
- an optical phase-shift assembly enabling a nonreciprocal optical phase-shift to be introduced between said counterpropagating modes;
- control means allowing the phase-shift amplitude to be varied periodically around a mean value that is very approximately zero, the amplitude and the frequency of this variation being such that the contrast of the population inversion grating existing in the amplifying medium is approximately zero.

Advantageously, the oscillation frequency of the phase shift is far higher than the inverse of the response time of the amplifying medium and the maximum phase-shift amplitude caused is such that the corresponding maximum frequency difference is several orders of magnitude greater than the frequency width of the dead zone of the laser gyro.

Advantageously, the oscillation frequency of the phase shift is much lower than the cutoff frequency of the stabilization device and the phase-shift amplitude is formed of a succession of temporal square pulses.

Advantageously, the oscillation frequency of the phase shift is far removed from the relaxation frequencies of the laser in order not to lead to resonant coupling which would have the effect of destabilizing the bidirectional transmission.

Advantageously, the optical assembly comprises at least, and in successively, a first quarter-wave plate, a first nonreciprocal optical rotator and a second quarter-wave plate the principal axes of which are perpendicular to those of the first quarter-wave plate.

In addition, the optical assembly may also comprise a second nonreciprocal optical rotator and a half-wave plate; the first quarter-wave plate, the first rotator, the half-wave plate, the second rotator and the second quarter-wave plate being successively positioned and in this order, the rotators being arranged such that the phase shifts introduced by the rotators under the effect of an external magnetic field compensate each other while the phase shifts introduced by the rotators under the effect of the control by the device add to each other.

Advantageously, the first or the second rotator comprises at least one material exhibiting the Faraday effect surrounded by an electromagnetic induction coil supplied with electric current; the control means comprise an ultrastable reference generator for generating a voltage which controls a stabilized current driving the periodic switching device for the current supplying the induction coil. The rotator may also comprise a magnetic shield and a magnetic field sensor.

Advantageously, the intensity stabilization device comprises at least a first linear polarizer, a nonreciprocal optical rotator and an optical element, said optical element being either a reciprocal optical rotator, the reciprocal effect possibly being induced by the use of a nonplanar cavity, or a birefringent element, at least one of the angles of rotation introduced in the polarization plane of the light or the birefringence being adjustable.

The invention also relates to a system for measuring angular velocity or relative angular positions along three different axes, characterized in that it comprises three laser gyros as previously described, oriented in different directions and mounted on a common mechanical structure.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
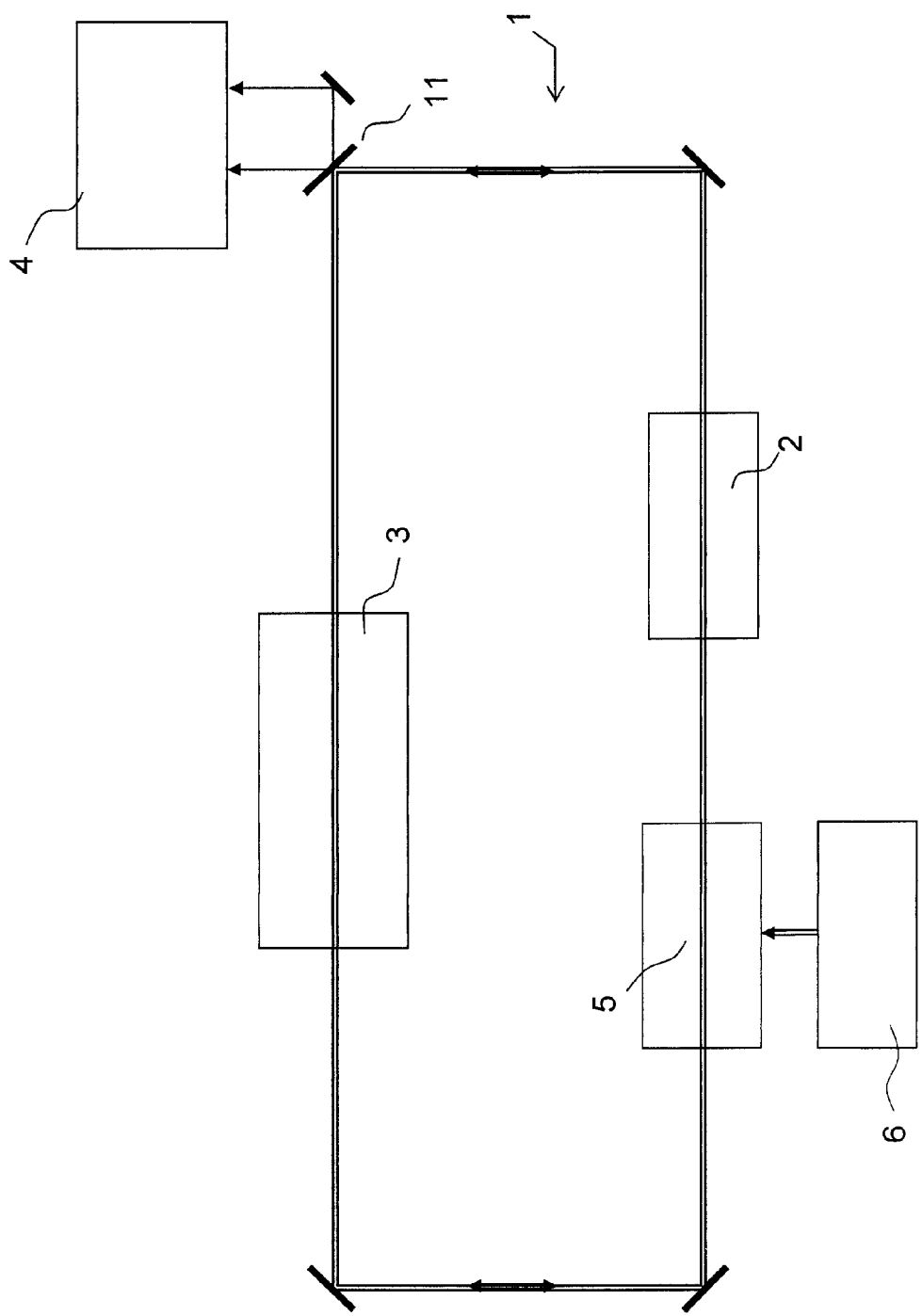
FIG. 1 represents the general operating principle of a laser gyro according to the invention.

A laser gyro according to the invention is represented in FIG. 1. It essentially comprises:
an optical cavity 1 formed of mirrors arranged in a ring of length L in which two counterpropagating optical modes circulate;
a solid-state amplifying medium 2;
a stabilization device 3 for stabilizing the intensity of the counterpropagating modes;
a measuring device 4; and
an optical phase-shift assembly 5 introducing a variable angle phase shift d controlled by an electronic device 6 between the two optical paths in counterpropagating modes.

Outside the optical assembly 5 the modes of propagation are linearly polarized and have different optical frequencies. The phase shift d caused by the optical assembly is equivalent to a pseudorotation $\Omega$ with the value:

$$\Omega = \frac{\lambda \cdot c \cdot d}{4\pi A}$$

with the same notation as previously, c being the speed of light in a vacuum.

Figure 2:
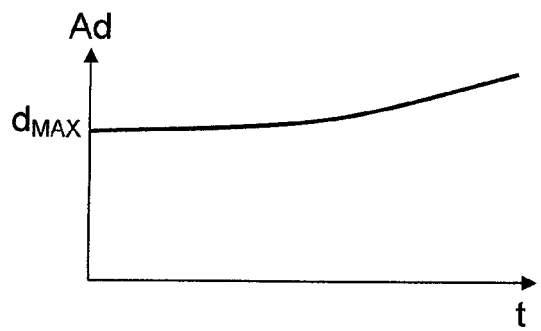
FIGS. 2, 3 and 4 represent possible variations in the amplitude of the phase shift introduced by the optical phase-shift assembly.

It would of course be possible, by using a constant and high bias, to keep the system outside the dead zone, and to do so over the whole range of use of the laser gyro. The major drawback with this solution is that it would then be necessary to know the value of this phase shift perfectly and to keep it constant. For, as FIG. 2 shows, there is a risk of the phase-shift amplitude $A_D$ drifting as a function of time under the influence of various parameters such as, for example, temperature. Hence, it is preferable to use a variable phase shift. Furthermore, a constant bias would not have any significant influence on the contrast of the population inversion grating existing in the amplifying medium.

Figure 3:
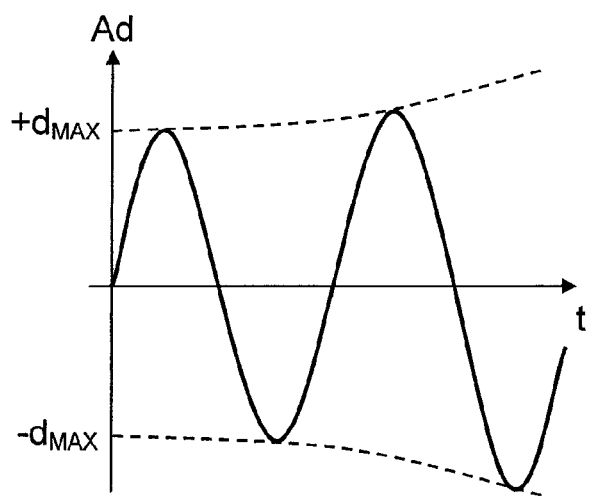

Control means allow the phase-shift amplitude to be varied in a periodic manner around a mean value that is very approximately zero. The phase shift hence varies between $-d_{MAX}$ and $+d_{MAX}$ as indicated on the curve in FIG. 3. Consequently, the pseudorotation $\Omega$ varies between two extreme values $-\Omega_{MAX}$ and $+\Omega_{MAX}$.

If the dead zone corresponds to rotations included between $\theta_{MIN}$ and $\theta_{MAX}$, the laser gyro functions correctly as long as the pseudorotation $\Omega$ remains outside this range. Consequently, it is therefore important that:

the absolute value of the value $\Omega_{MAX}$ is very markedly higher than the values $\theta_{MIN}$ and $\theta_{MAX}$; and when the phase shift varies, the duration for which the phase shift is sufficiently low to put the system in the dead zone is as small as possible.

Furthermore, to reduce the contrast of the population inversion grating existing in the amplifying medium, it is also necessary that:

the amplitude and the frequency of this variation are such that the contrast of the population inversion grating existing in the amplifying medium is approximately zero; and the oscillation frequency of the phase shift is far higher than the inverse of the response time of the amplifying medium, such that the grating does not have the time to become established in the amplifying medium. For example, in the case of amplifying medium made of Nd:YAG the value of the response time is around 200 microseconds.

Figure 4:
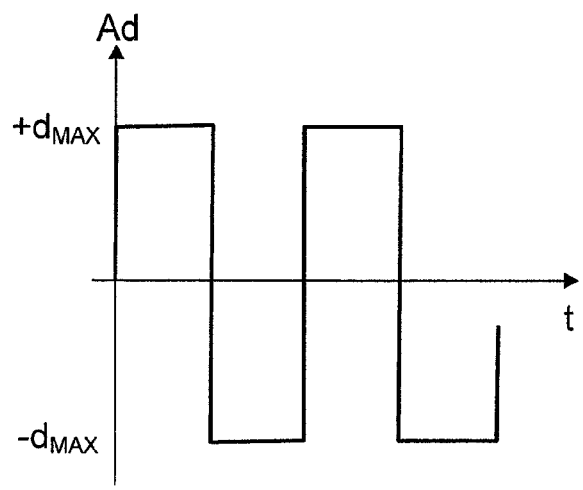

To best meet these conditions:

the maximum frequency difference caused by the phase shift should be chosen to be several orders of magnitude greater than the frequency width of the dead zone of the laser gyro; and the phase-shift amplitude should be formed of a succession of temporal square pulses, as indicated in FIG. 4.

To minimize the measurement errors and to simplify the detection means, the bias also needs to be as symmetric as possible. By this means, the slow drifts in the maximum amplitude of the bias compensate each other. In addition, if the mean value of the alternating bias is sufficiently close to zero, typically of the order of magnitude of the bias caused by the rotation of the Earth, the electronics for processing the output signal may be identical to those usually used, for example, in mechanically activated laser gyros.

There are various means for producing the optical phase-shift assembly. One of the simplest means is to use nonreciprocal Faraday rotators.

Figure 5:
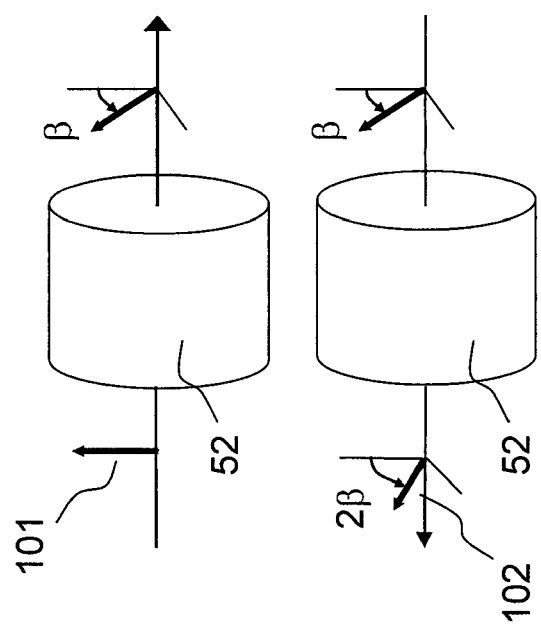
FIG. 5 represents the operating principle of a nonreciprocal optical rotator.

An optical rotation of the polarization of a wave is called nonreciprocal when the rotation effects of the polarization accumulate after a round trip of said wave in an optical component having this effect. The optical component is called a nonreciprocal optical rotator. For example, the materials exhibiting the Faraday effect are materials which, when they are subjected to a magnetic field, cause the plane of polarization of the beams passing through them to rotate. This effect is not reciprocal. Hence, the same beam going in the opposite direction will undergo a rotation of its plane of polarization in the same direction. This principle is illustrated in FIG. 5. The directions of propagation are indicated by horizontal arrows in this figure. The polarization direction of the linearly polarized beam 101 undergoes a rotation through an angle $\beta$ when it traverses the Faraday effect component 52 in the forward direction (upper schema of FIG. 5). If an identical beam 102, propagating in the opposite direction and with its polarization direction initially rotated by $\beta$, is reinjected into the Faraday effect component, its polarization direction rotates again through the angle $\beta$ in traversing the component, the total angle of rotation therefore being $2\beta$ after a round trip (lower schema of FIG. 5).

Figure 6:
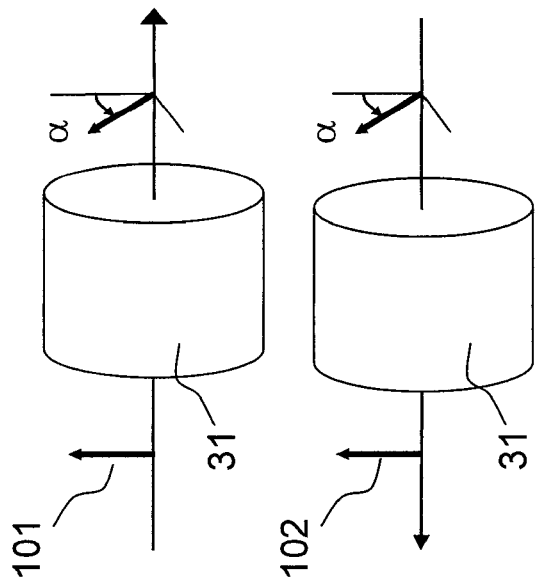
FIG. 6 represents the operating principle of a reciprocal optical rotator.

In a conventional reciprocal rotator 31, the polarization direction of the beam 101 rotates by $+\alpha$ in the forward direction and the polarization direction of the beam 102 rotates by $-\alpha$ in the reverse direction of propagation, so as to return to the initial polarization direction as illustrated in the schemas of FIG. 6.

Figure 7:
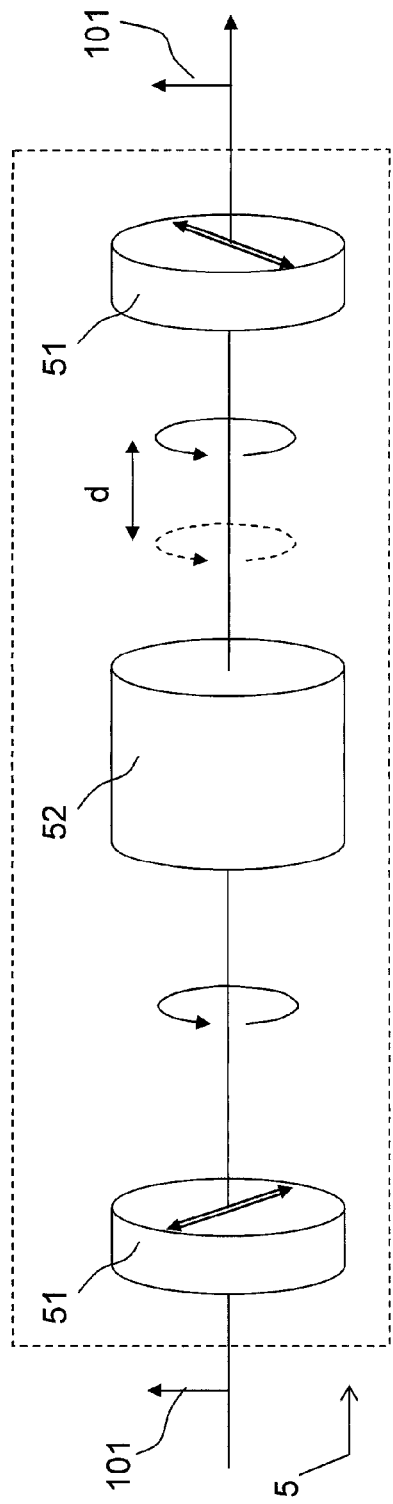
FIG. 7 represents the operating principle of an optical assembly consisting in succession of a first quarter-wave plate, a nonreciprocal optical rotator and a second quarter-wave plate.

The operation of the optical phase-shift assembly is represented in FIG. 7. When a linearly polarized optical mode 101 (right arrow in FIG. 7) traverses the first quarter-wave plate 51, if the principal axis of this plate, represented by a double arrow, is inclined at 45 degrees to the polarization direction, then the polarization of the mode comes out with a right circular polarization (continuous semicircular arrow in FIG. 7). This circularly polarized wave undergoes a nonreciprocal phase shift d when it traverses the nonreciprocal optical rotator 52. It is then transformed again into a linearly polarized wave by the second quarter-wave plate 51, the principal axis of which is perpendicular to the principal axis of the first quarter-wave plate. A nonreciprocal phase shift has thus been introduced into the mode traversing this optical assembly while preserving the linear polarization of the wave.

Figure 8:
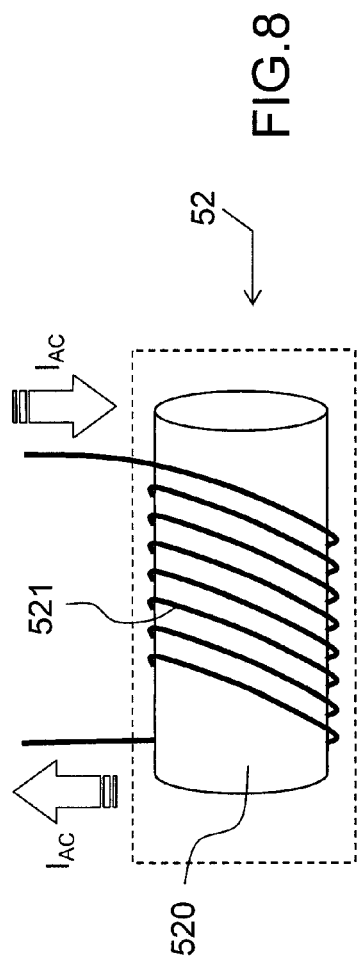
FIGS. 8 and 9 represent the operating principle of the Faraday rotators employed in the invention.

In these various embodiments, the nonreciprocal rotator may be a Faraday rotator consisting of a rod 520 made of a material that may, for example, be TGG (acronym for Terbium Gadolinium Garnet) or YAG (acronym for Yttrium Aluminum Garnet). The rod is then placed in the magnetic field of a solenoid 521 through which an alternating electric current $I_{AC}$ flows, as illustrated in FIG. 8.

For protection against the influence of external magnetic fields, a magnetic shield may be positioned around the phase-shift element. In the same way, a magnetic field sensor may be integrated close to the phase-shift element allowing the interfering magnetic field to be measured. In this case, this interfering magnetic field is compensated for by adding a current proportional to the signal delivered by the magnetic field sensor to the alternating current flowing through the solenoid.

Figure 9:
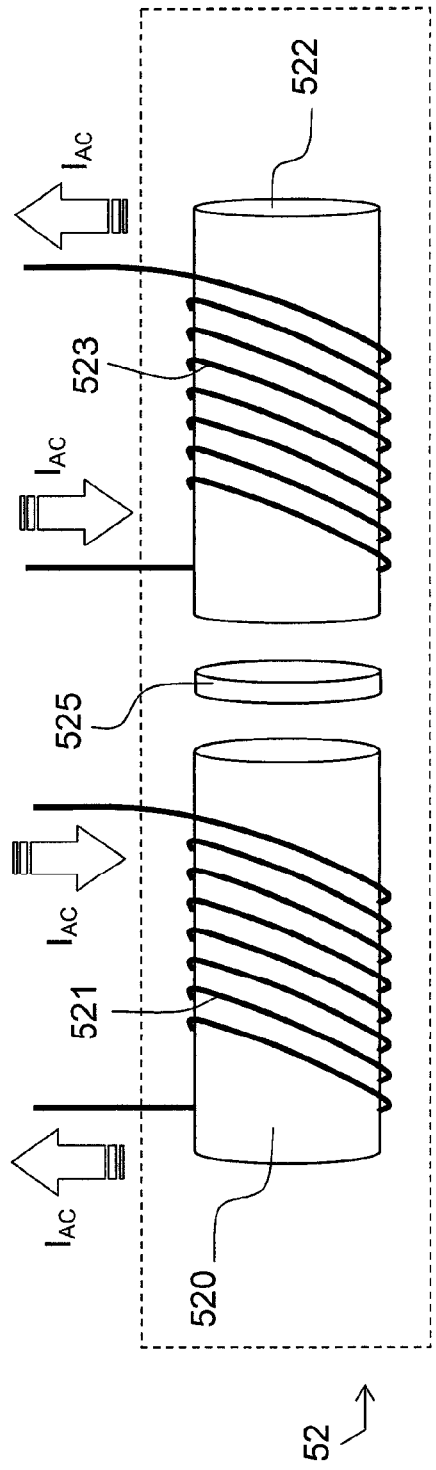

It is also possible, as indicated in FIG. 9, to separate the single rotator into two identical rotators separated by a half-wave plate 525. The rotators are arranged in such a way that, for a wave circularly polarized in a given direction of rotation, the phase shift introduced by the first rotator under the action of the control device is added to that introduced by the second rotator. For that it suffices that the currents flowing through the induction coils 521 and 523 surrounding the rods 520 and 522 of the two rotators are in opposite directions. The half-wave plate 525 separating the two rotators reverses the direction of rotation of the polarization of the incident wave in such a way that the phase shifts caused by the induction coils of the two rotators are added to each other. Of course, an interfering magnetic field of the same size and the same direction applied to the two rotators causes two phase shifts that cancel each other out when the circularly polarized wave passes through the first rotator with a first direction of rotation then the second rotator with a reversed direction. The influence of interfering magnetic fields is thus eliminated or considerably reduced.

The optical phase-shift assembly is driven by electronic control means 6. The control means may comprise an ultrastable reference generator for generating a voltage which controls a stabilized current supplying a periodic switching device for the current $I_{AC}$ supplying the induction coil.

Several embodiments of the intensity stabilization device exist.

Figure 10:
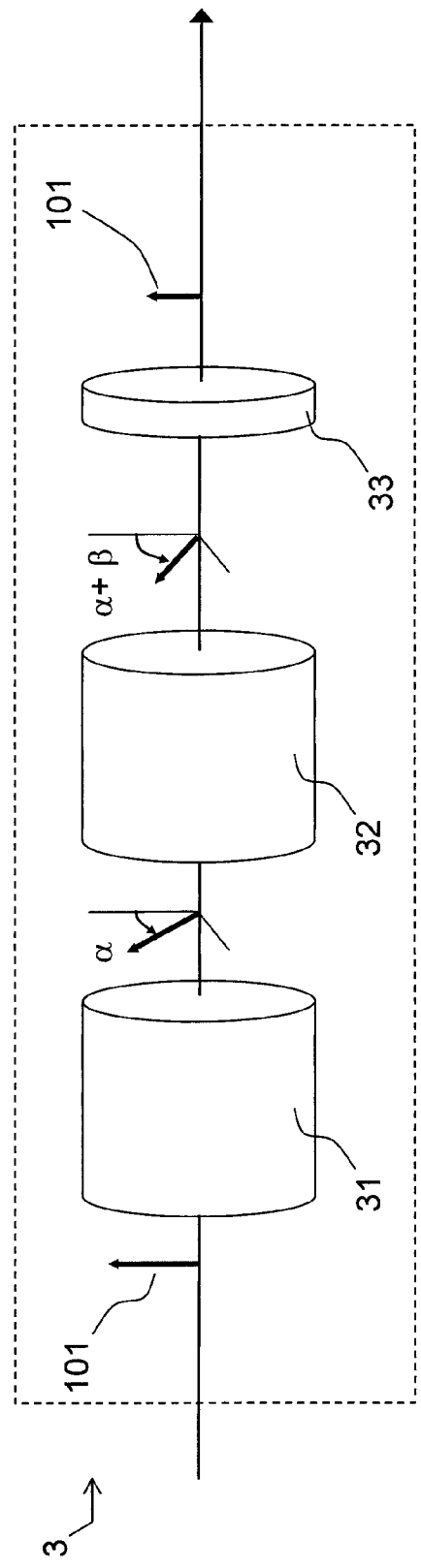
FIG. 10 represents the operating principle of a stabilization device comprising a polarizer, a reciprocal optical rotator and a nonreciprocal optical rotator.

By way of nonlimiting example, the intensity stabilization device 3 comprises a reciprocal optical rotator 31 and a nonreciprocal optical rotator 32. The operation of the stabilization device is represented in FIG. 10.

In this type of cavity according to the invention, the eigenstates of the counterpropagating modes are linearly polarized along an axis parallel to the axis of the polarizer 33. In the forward direction the first optical mode 101 passes through first the reciprocal optical rotator 31 then the nonreciprocal optical rotator 32 and finally the polarizer 33. Consequently, its polarization direction rotates through an angle α after traversing the first element and through an angle equal to α+β after traversing the second element. On traversing the polarizer 33, the mode is therefore attenuated by a factor $\cos^2(\alpha+\beta)$. In the reverse direction the second optical mode will also be attenuated by the polarizer 33 after having made a complete circuit. It is easily demonstrated that the value of the second factor is $\cos^2(\alpha-\beta)$. Hence, the attenuation of the modes is different according to their direction of propagation and depends directly on the size of the effects undergone by the polarization of the two modes. It is therefore possible to vary in a different way the losses undergone by the counterpropagating modes by varying at least one of the two values α or β. The value of the differential losses is controlled by the difference in intensity between the two modes in such a way that the most intense mode undergoes the highest losses, which stabilizes the laser.

The quarter-wave plates are optical components having a reciprocal effect. Consequently, it is also possible to produce a cavity including a servo device comprising at least:

first optical assembly consisting of a first linear polarizer 33 and an adjustable nonreciprocal optical rotator 32, the reciprocal optical rotator no longer being necessary in this configuration; and second optical assembly consisting in succession of a first quarter-wave plate 51, a nonreciprocal optical rotator 52 and a second quarter-wave plate 51, the axis of the first plate 51 being inclined at an angle φ to the polarization direction of the linear polarizer with:

φ=π/4+θ, θ being different from 0, the axis of the second plate 51 being inclined at about 45 degrees to the polarization direction of the linear polarizer 33 and at about 90 degrees to the axis of the first plate 51.

With this optical arrangement it is possible to generate differential losses and cause a nonreciprocal phase shift (same effect as that obtained with the first embodiment with at least one optical component).

The reciprocal rotator may be an optically active element. It may also be replaced by a wave plate or a second polarizing optical element rotated relative to the first. It may also be obtained by means of a nonplanar cavity through a particular arrangement of cavity mirrors such that the propagation of the optical beams does not occur within a plane. The effect of the rotator may be either constant or variable, then being controlled by the servosystem.

It is to be noted that, as the servo device is able to operate through to a certain cutoff frequency, it is preferable for the oscillation frequency of the phase shift to be far lower than this frequency. It is also important that the oscillation frequency of the phase shift be chosen to be significantly different from the eigenfrequencies of the laser so as not to induce resonant coupling.

The various operations for determining the frequency difference $\Delta v_S$ existing between the two counterpropagating modes are carried out by the measuring device which comprises:

optical means for making the first propagation mode interfere with the second propagation mode;

optoelectronic means for determining the optical frequency difference $\Delta v_S$ between the first propagation mode and the second propagation mode; and electronic means for calculating the interference frequency or counting of the fringes of the beat signal.

It is of course possible to assemble several laser gyros according to the invention in order to produce a system for measuring angular velocities or relative angular positions on three different axes, comprising, for example, three laser gyros mounted on a common mechanical structure.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A laser gyro enabling measurement of the angular velocity or the relative angular position about a determined rotation axis, comprising:
    an optical ring cavity in which two counterpropagating optical modes circulate;
    a solid-state amplifying medium;
    a device for stabilizing the intensities of the counterpropagating modes; wherein said cavity also comprises:
    an optical phase-shift assembly enabling a nonreciprocal optical phase-shift to be introduced between said counterpropagating modes;
    control means allowing the phase-shift amplitude to be varied periodically around a mean value that is approximately zero, the amplitude and the frequency of this variation being such that the contrast of the population inversion grating existing in the amplifying medium is approximately zero.

2. The laser gyro as claimed in claim 1, wherein the oscillation frequency of the phase shift is far higher than the inverse of the response time of the amplifying medium.

3. The laser gyro as claimed in claim 1, wherein the maximum phase-shift amplitude corresponds to a maximum frequency difference between the two counterpropagating modes, this maximum frequency difference being several orders of magnitude greater than the frequency width of the dead zone of the laser gyro.

4. The laser gyro as claimed in claim 1, wherein the oscillation frequency of the phase shift is much lower than the cutoff frequency of the stabilization device.

5. The laser gyro as claimed in claim 1, wherein the oscillation frequency of the phase shift is far removed from the relaxation frequencies of the laser.

6. The laser gyro as claimed in claim 1, wherein the phase-shift amplitude is formed of a succession of temporal square pulses.

7. The laser gyro as claimed in claim 1, wherein the optical assembly comprises at least and successively a first quarter-wave plate, a first nonreciprocal optical rotator and a second quarter-wave plate the principal axes of which are perpendicular to those of the first quarter-wave plate.

8. The laser gyro as claimed in claim 7, wherein the optical assembly also comprises a second nonreciprocal optical rotator and a half-wave plate; the first quarter-wave plate, the first rotator, the half-wave plate, the second rotator and the second quarter-wave plate being successively positioned, the rotators being arranged such that the global phase shift caused by an external magnetic field is zero.

9. The laser gyro as claimed in claim 8, wherein the first or the second rotator comprises at least one material exhibiting the Faraday effect surrounded by an electromagnetic induction coil supplied with electric current.

10. The laser gyro as claimed in claim 9, wherein the rotator comprises a magnetic shielding.

11. The laser gyro as claimed in claim 9, wherein the rotator comprises a magnetic field sensor.

12. The laser gyro as claimed in claim 8, wherein the control means comprise an ultrastable reference generator for generating a voltage which controls a stabilized current supplying power to a periodic switching device for the current supplying the induction coil.

13. The laser gyro as claimed in claim 1, wherein the servo device comprises at least a first linear polarizer, a nonreciprocal optical rotator and an optical element, said optical element being either a reciprocal optical rotator, or a birefringent element, at least one of the effects or the birefringence being adjustable.

14. A system for measuring angular velocity or relative angular positions along three different axes, comprising three laser gyros as claimed in claim 1, oriented in different directions and mounted on a common mechanical structure.

* * * * *